United States Patent
Kishima

(10) Patent No.: US 9,567,014 B2
(45) Date of Patent: Feb. 14, 2017

(54) VEHICLE-BODY REAR STRUCTURE

(71) Applicant: TOYOTA JIDOSHA KABUSHIKI KAISHA, Toyota-shi, Aichi-ken (JP)

(72) Inventor: Fumihiko Kishima, Kounan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/651,936

(22) PCT Filed: Dec. 6, 2013

(86) PCT No.: PCT/JP2013/082841
§ 371 (c)(1),
(2) Date: Jun. 12, 2015

(87) PCT Pub. No.: WO2014/092018
PCT Pub. Date: Jun. 19, 2014

(65) Prior Publication Data
US 2015/0329151 A1 Nov. 19, 2015

(30) Foreign Application Priority Data
Dec. 12, 2012 (JP) ................. 2012-271493

(51) Int. Cl.
*B62D 35/00* (2006.01)
*B62D 25/08* (2006.01)
(Continued)

(52) U.S. Cl.
CPC ............ *B62D 35/00* (2013.01); *B62D 25/08* (2013.01); *B62D 35/02* (2013.01); *B62D 37/02* (2013.01); *B62D 25/16* (2013.01)

(58) Field of Classification Search
CPC ......... B62D 37/02; B62D 25/08; B62D 35/00; B62D 25/16; B62D 35/02
See application file for complete search history.

(56) References Cited

U.S. PATENT DOCUMENTS 4,334,694 A 6/1982 Iwanicki
2014/0378043 A1* 12/2014 Mueller ............... B62D 25/16
454/152

FOREIGN PATENT DOCUMENTS

JP S55-94864 A 7/1980
JP S60-188684 U 12/1985
(Continued)

OTHER PUBLICATIONS

Mar. 11, 2014 International Search Report issued in Application No. PCT/JP2013/082841.
(Continued)

*Primary Examiner* — Glenn Dayoan
*Assistant Examiner* — Melissa A Black
(74) *Attorney, Agent, or Firm* — Oliff PLC

(57) ABSTRACT

A first opening is formed in a vertical wall portion, and a second opening is formed in an underfloor. Airflow partially flows into the first opening and hits a rear face of an inclined wall portion, so as to be discharged from the second opening toward a vehicle rear side. The airflow that cannot enter the first opening flows toward the inclined wall portion along the vertical wall portion so that the airflow is drawn to the airflow flowing into the first opening. The airflow that cannot enter the first opening flows toward the vehicle rear side along the inclined wall portion. Detachment of the airflow from the inclined wall portion is restrained, and airflow flows toward the vehicle rear side along the underfloor of the vehicle. Air flowing from a side part of the vehicle into the rear wheel house restrains a decrease in steering stability.

6 Claims, 7 Drawing Sheets

(51) Int. Cl.
  *B62D 37/02*    (2006.01)
  *B62D 35/02*    (2006.01)
  *B62D 25/16*    (2006.01)

(56)    References Cited

FOREIGN PATENT DOCUMENTS

| | | |
|---|---|---|
| JP | H07-25369 A | 1/1995 |
| JP | 2008-503232 | 2/2008 |
| JP | 2008-503232 A | 2/2008 |

OTHER PUBLICATIONS

Jun. 2, 2008 Technical Disclosure Bulletin No. 2008-503232.
Jan. 6, 2010 Technical Disclosure Bulletin No. 2010-500144.
English translation of Aug. 11, 2015 Office Action issued in Japanese Application No. 2012-271493.
English translation of Apr. 5, 2016 Office Action issued in Japanese Application No. 2012-271491.

\* cited by examiner

VEHICLE-BODY REAR STRUCTURE

TECHNICAL FIELD

The present invention relates to a vehicle-body rear structure.

BACKGROUND ART

In a vehicle rear body structure described in Patent Document 1, a narrowing surface is formed on a side part of a rear bumper, thereby decreasing an air resistance of a vehicle. Further, an outer surface of a corner part of the rear bumper is placed so as to be distanced outward in a vehicle width direction from the narrowing surface, so that a cross wind receiving portion is formed. This improves cross wind stability of the vehicle.

Further, the rear bumper has a slit and an exhaust port at a vehicle rear side of a rear tire, and the slit and the exhaust port are communicated with each other via a passage portion extending in a vehicle front-rear direction. Hereby, turbulence generated in a rear tire house is discharged toward the vehicle rear side from the exhaust port through the slit and the passage portion.

CITATION LIST

Patent Documents

Patent Document 1: Japanese Patent Application Publication No. 07-25369 (JP 07-25369 A)
Patent Document 2: Japanese Utility Model Application Publication No. 60-188684 (JP 60-188684 U)

SUMMARY OF THE INVENTION

Problem to be Solved by the Invention

In the meantime, in the vehicle rear body structure, when air flows from a vehicle side part (a vehicle width direction outer part) into the rear tire house, an airflow that blows diagonally downward toward an inner side in the vehicle width direction is caused along a rear part of the rear tire house. Hereby, when the airflow blows toward a vehicle lower side from a rear end of the rear tire house, steering stability of the vehicle may decrease. In this respect, there is room for improvement in the vehicle rear body structure.

The present invention has been accomplished in consideration of the above fact, and is intended to provide a vehicle-body rear structure that is able to restrain a decrease in steering stability due to air flowing from a vehicle side part into a wheel house.

Means for Solving the Problem

A vehicle-body rear structure according to a first aspect includes: an inclined wall portion provided in a rear end of a wheel house in which a rear wheel is placed, so as to be inclined toward a vehicle rear side as it goes toward a vehicle lower side in a side view; a promoting portion provided in a rear part of the wheel house, the promoting portion including a vertical wall portion formed at a vehicle upper side relative to the inclined wall portion so as to be connected to the inclined wall portion and to extend toward the vehicle upper side, and a first opening in the vertical wall portion, the promoting portion being configured to promote air flowing from a vehicle side part into the wheel house to flow toward the vehichle rear side along the inclined wall portion: and a second opening formed in an undrfloor at a vehicle rear side relative to the wheel house, the second opening being placed at an inner side, in a vehicle width direction, relative to the first opening.

In the vehicle-body rear structure according to the first aspect, the inclined wall portion is provided in the rear end of the wheel house in which the rear wheel is placed, and the inclined wall portion is inclined toward the vehicle rear side as it goes toward the vehicle lower side in a side view. When air flows into the wheel house from the vehicle side part, an airflow that blows diagonally downward toward an inner side in the vehicle width direction is caused along a rear part of the wheel house.

Here, the rear part of the wheel house is provided with the promoting portion, so that so that the air flowing from the vehicle side part into the wheel house is promoted to flow toward the vehicle rear side along the inclined wall portion. Hereby, the airflow that blows downward toward an inclined wall side along the rear part of the wheel house flows toward the vehicle rear side along the inclined wall portion. This restrains detachment of the airflow from the inclined wall portion, and also restrains the airflow from being blown out from the wheel house toward the vehicle lower side. Accordingly, it is possible to restrain a decrease in steering stability due to the air flowing from the vehicle side part into the wheel house.

further, the vertical wall portion connected to the inclined wall portion and extending toward the verhicle upper side is formed at a vehicle upper side relative to the inclined wall portion, and the vertical wall portion serves as the promoting portion.

Hereby, a continuous surface is formed of a front surface of the vertical wall portion and a front surface of the inclined wall portion. Hereby, the airflow flowing diagonally downward toward the inner side in the vehicle width direction along the rear part of the wheel house is prompted to the flow toward the vehicle rear side along the front surface of the of the vertical wall portion and the front surface of the inclined wall portion. As a result, detachment of the airflow from the inclined wall portion is restrained, and the airflow is restrained from being blown out from the wheel house toward the vehicle lower side.

Further, the first opening is formed in the vertical wall portion, so that the first opening serves as the promoting portion as well as the vertical wall portion. Further, the second opening is formed in the underfloor at the vehicle rear side relative to the wheel house. Accordingly, the airflow that blows diagonally downward toward the inner side in the vehicle width direction along the rear part of the wheel house partially flows into the first opening and hits a rear face of the inclined wall portion. Then, the airflow thus hitting the rear face of the inclinded wall portion is efficiently changed in direction toward the vehicle rear side by the inclined wall portion, so as to be discharged from the second opening to the vehicle rear side. In the meantime, the airflow that cannot enter the first opening flows along the vertical wall portion so that the airflow is drawn to the airflow flowing into the first opening. As a result, the airflow that cannot enter the first opening is promoted to flow toward the vehicle rear side along the inclined wall portion, so that detachment of the inclined wall portion is restrained.

Besides, as described above, the airflow flowing into the first opening hits the rear face of the inclined wall portion, which causes a down force in the vehicle. This accordingly makes it possible to improve steering stability of the vehicle by use of the air flowing into the first opening.

Furthermore, the second opening is placed at the inner side, in the vehicle width direction, relative to the first opening.

On this account, the airflow flowing into the first opening can be discharged from the second opening efficiently. That is, when the air flows into the wheel house from the vehicle side part, an airflow that blows diagonally downward toward the inner side in the vehicle width direction is caused along the rear part of the wheel house. Therefore, the airflow includes a flow component toward the inner side in the vehicle width direction. Hereby, when the second opening is placed at the inner side, in the vehicle width direction, relative to the first opening, the airflow flowing into the first opening flows toward the second opening, so that the airflow is discharged from the second opening efficiently.

A vehicle-body rear structure according to a second aspect is configured such that, in the vehicle-body rear structure according first aspect, the first opening is opened diagonally upward toward an outer side in the vehicle width direction.

In the vehicle-body rear structure according to the second aspect, an opening direction of the first opening generally accords with a direction of the airflow that blows diagonally downward toward the inner side in the vehicle width direction along the rear part of the wheel house. Hereby, the air flowing into the wheel house from the vehicle side part can be easily flowed into the first opening.

A vehicle-body rear structure according to a third aspect is configured such that, in the vehicle-body rear structure according to the first aspect or the second aspect, a lateral wall portion extending in a vehicle front-rear direction is formed at an inner side, in the vehicle width direction, relative to the second opening.

In the vehicle-body rear structure according to the third aspect, the lateral wall portion is formed at the inner side, in the vehicle width direction, relative to the second opening, and the lateral wall portion extends in the vehicle front-rear direction. Then, as described above, the airflow flowing into the first opening includes a flow component toward the inner side in the vehicle width direction. Accordingly, the air flowing into in the first opening flows toward the inner side in the vehicle width direction and the air partially hits the lateral wall portion. This allows the air hitting the lateral wall portion to flow toward the vehicle rear side.

A vehicle-body rear structure according to fourth aspect is configured such that, in the vehicle-body rear structure according to any one of the first aspect to the third aspect, vertical wall portion is extended along the vehicle width direction or is inclined toward the vehicle rear side as it goes toward the inner side in the vehicle width direction in a plan view.

In the vehicle-body rear structure according to the fourth aspect, the vertical wall portion is extended along the vehicle width direction or is inclined toward the vehicle rear side as it goes toward the inner side in the vehicle width direction in a plan view. Hereby, the air flowing from the vehicle side part into the wheel house can be easily flowed toward the vehicle rear side along the inclined portion. That is, if the vertical wall portion is inclined toward the vehicle front side as it goes toward the inner side in the vehicle width direction in a plan view, a flow component toward the vehicle front side is caused in the airflow flowing diagonally downward toward the inner side in the vehicle width direction along the vertical wall portion. Therefore, in this case, the airflow is hard to flow toward the vehicle rear side along the inclined portion. Hereby, the airflow may be detached from the vertical wall portion so as to be blown out toward the vehicle lower side.

However, the vertical wall portion is extended along the vehicle width direction or is inclined toward the vehicle rear side as it goes toward the inner side in the vehicle width direction in a plan view. Accordingly, it is possible to restrain a flow component toward the vehicle front side from being caused in the airflow flowing diagonally downward toward the vehicle width direction along the vertical direction. Accordingly, the air flowing from the vehicle side part into the wheel house can be easily flowed toward the vehicle rear side along the inclined portion.

Advantageous Effects of Invention

According to the vehicle-body rear structure according to the first aspect, it is possible to restrain a decrease in steering stability due to the air flowing from the vehicle side part into the wheel house.

Further, it is possible to improve steering stability of the vehicle by use of the air flowing into the first opening and to easily cause the air that cannot enter the first opening to flow toward the vehicle rear side along the inclined wall portion.

Furthermore, it is possible to discharge the air flowing into the first opening, from the second opening efficiently.

According to the vehicle-body rear structure according to the second aspect, the air flowing into the wheel house from the vehicle side part can be easily flowed into the first opening.

According to the vehicle-body rear structure according to the third aspect, it is possible to flow the air flowing into the first opening, toward the vehicle rear side.

According to the vehicle-body rear structure according to the fourth aspect, it is possible to easily flow the air flowing from the vehicle side part into the wheel house, toward the vehicle rear side along the inclined portion.

MODES FOR CARRYING OUT THE INVENTION

Figure 2:
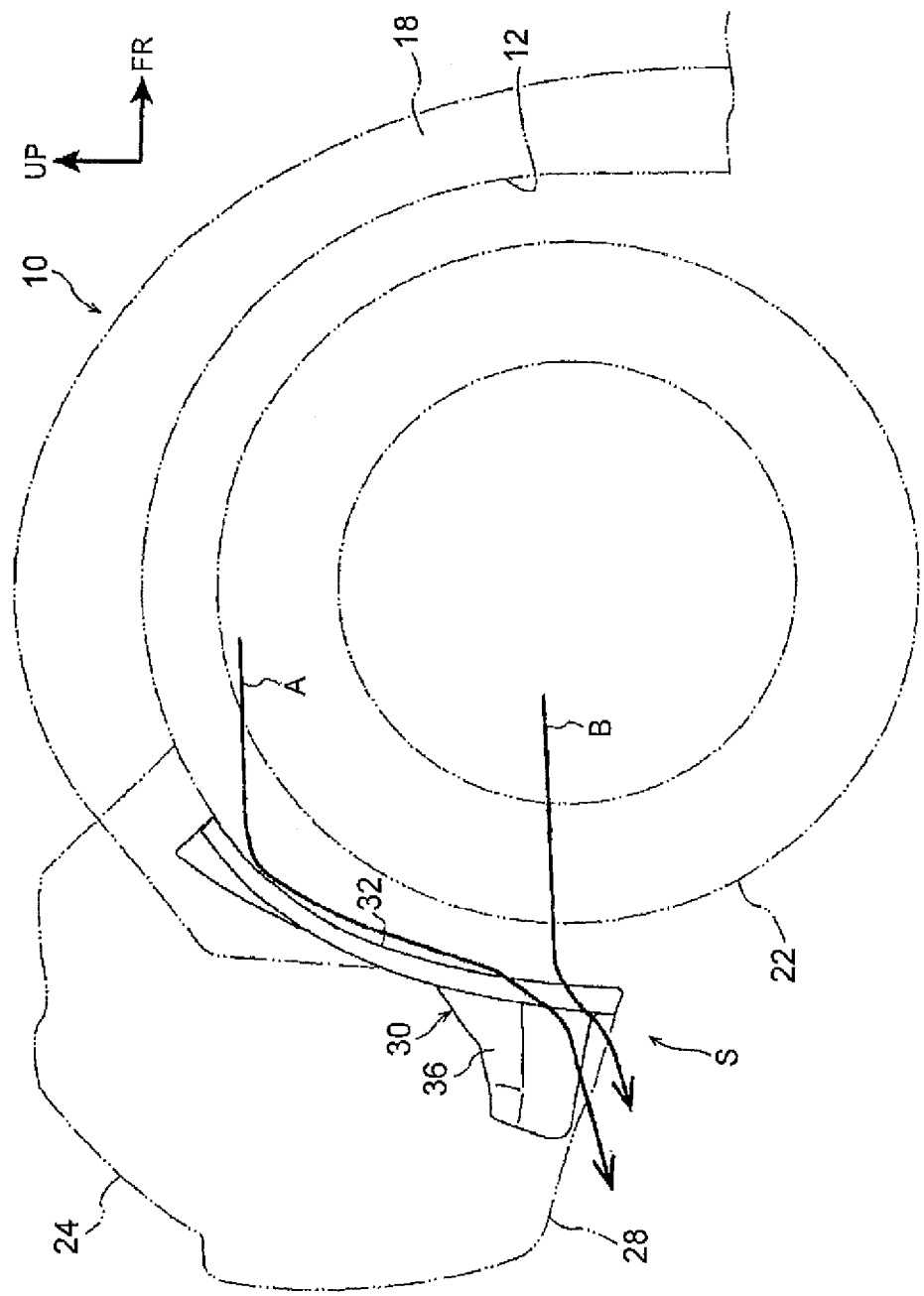
FIG. 2 is a side view illustrating the rear wheel house in illustrated FIG. 1, when viewed from a vehicle right side.
Figure 3:
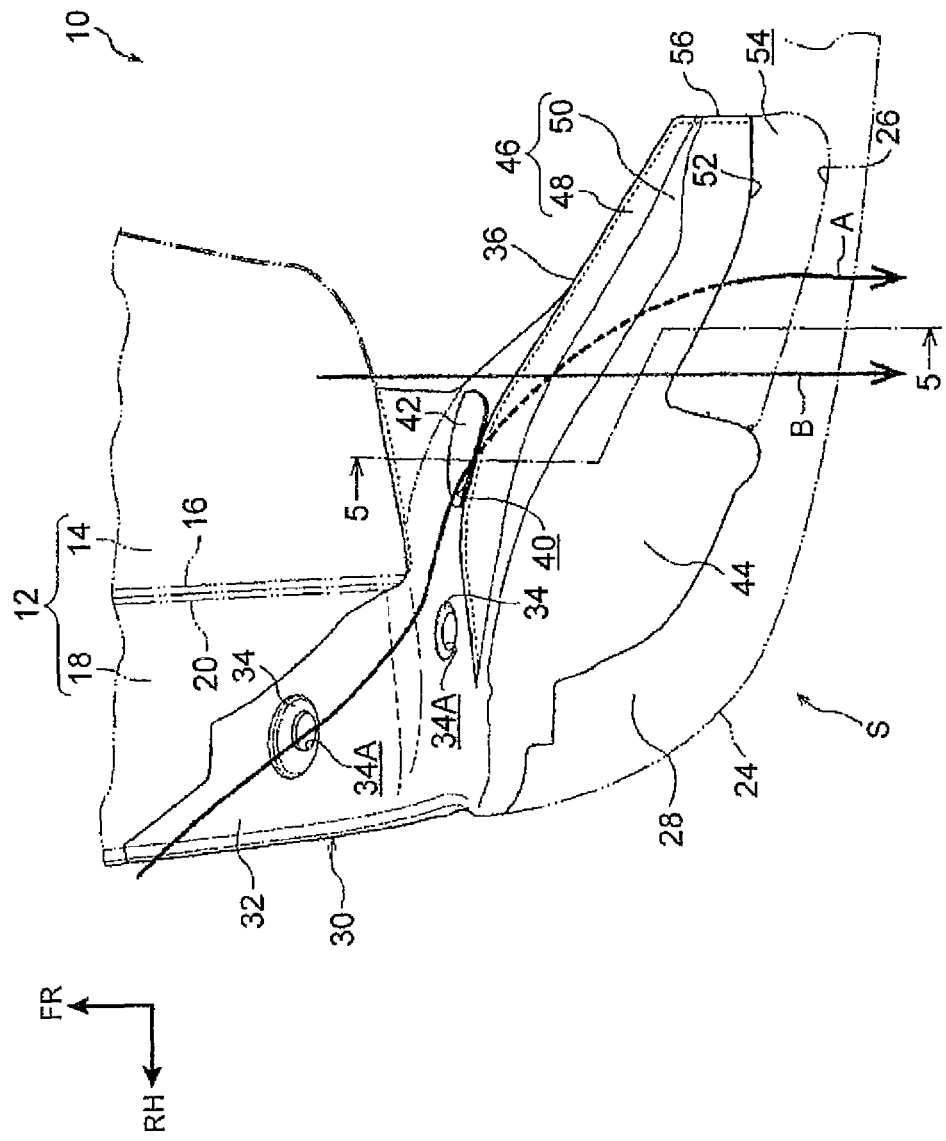
FIG. 3 is a plan view of the rear part of the rear wheel house illustrated in FIG. 1, when viewed from a vehicle lower side.
Figure 4:
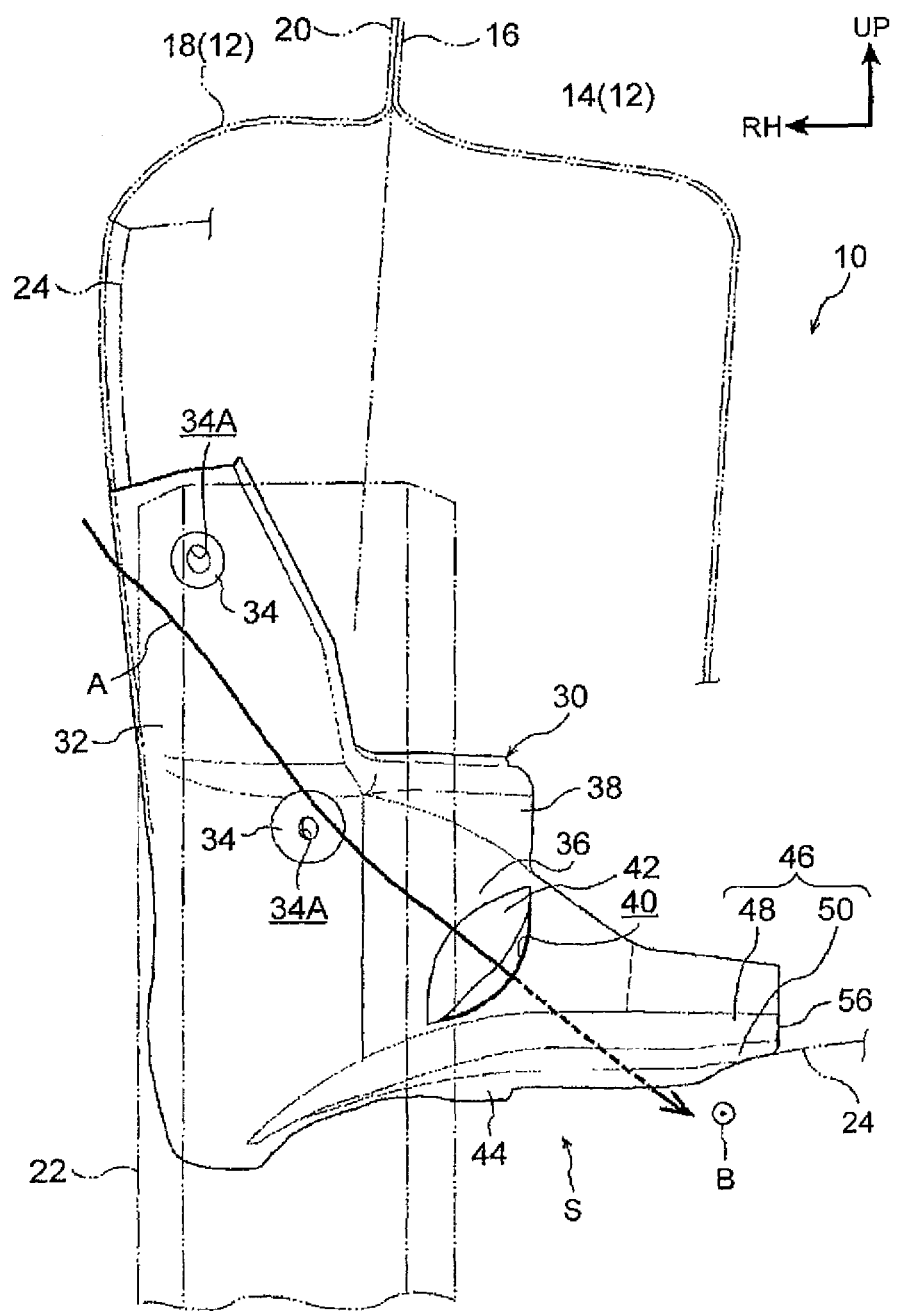
FIG. 4 is a front view illustrating the rear part of the rear wheel house illustrated in FIG. 1, when viewed from a vehicle front side.

FIG. 2 is a schematic side view illustrating a rear part of a vehicle 10 to which a vehicle-body rear structure S according to the present embodiment is applied, when viewed from a vehicle right side. FIG. 3 is a schematic plan view illustrating a rear part of a rear wheel house 12 of the vehicle 10 when viewed from a vehicle lower side. Further, FIG. 4 is a schematic front view illustrating the rear part of the rear wheel house 12 of the vehicle 10 when viewed from a vehicle front side. Note that, in the figures, the vehicle front side is indicated by an arrow FR, the vehicle right side (one side in a vehicle width direction) is indicated by an arrow RH, and a vehicle upper side is indicated by an arrow UP. Further, vehicle-body rear structures S are symmetrically provided on right and left sides in the vehicle width direction. Accordingly, the vehicle-body rear structure S on the vehicle right side is described herein, but a description of the vehicle-body rear structure S on a vehicle left side is omitted.

As illustrated in these figures, the vehicle-body rear structure S is applied to a rear wheel house 12 as a wheel house for a rear part of the vehicle 10. A detailed description thereof is given below.

As illustrated in FIGS. 3 and 4, the vehicle 10 includes: a wheel house inner 14 constituting a vehicle width direction inner part of the rear wheel house 12; a wheel house outer 18 constituting a vehicle width direction outer part of the rear wheel house 12; a rear bumper 24 placed in a rear end of the vehicle 10; and a bumper seal 30 disposed in a rear end of the rear wheel house 12.

The wheel house inner 14 is formed in a generally bottomed semicylindrical shape projecting inwardly in the vehicle width direction, and a lower end of the wheel house inner 14 is connected to a vehicle-body frame member (not shown) extending in a vehicle front-rear direction. Further, an inner side flange portion 16 is formed integrally with an outer peripheral portion of the wheel house inner 14 on an outer side in the vehicle width direction. The inner side flange portion 16 is placed with its plate-thickness direction being along generally the vehicle width direction.

The wheel house outer 18 is formed generally in a semicylindrical shape, and is placed on the outer side, in the vehicle width direction, relative to the wheel house inner 14. Further, an outer side flange portion 20 is formed integrally with an outer peripheral portion of the wheel house outer 18 on an inner side in the vehicle width direction. The outer side flange portion 20 is placed with its plate-thickness direction being along generally the vehicle width direction, so as to be connected to the inner side flange portion 16 by welding or the like. The rear wheel house 12 covers an upper part of a rear tire 22 as a rear wheel from the vehicle upper side (see FIG. 4).

As illustrated in FIGS. 1 to 4, a rear bumper 24 is disposed in the rear end of the vehicle 10 with its longitudinal direction being along the vehicle width direction. Both ends of the rear bumper 24 in the vehicle width direction are curved toward the vehicle front side, so that the both ends of the rear bumper 24 in the vehicle width direction are connected to the outer peripheral portion of the wheel house outer 18 on the outer side in the vehicle width direction.

Figure 1:
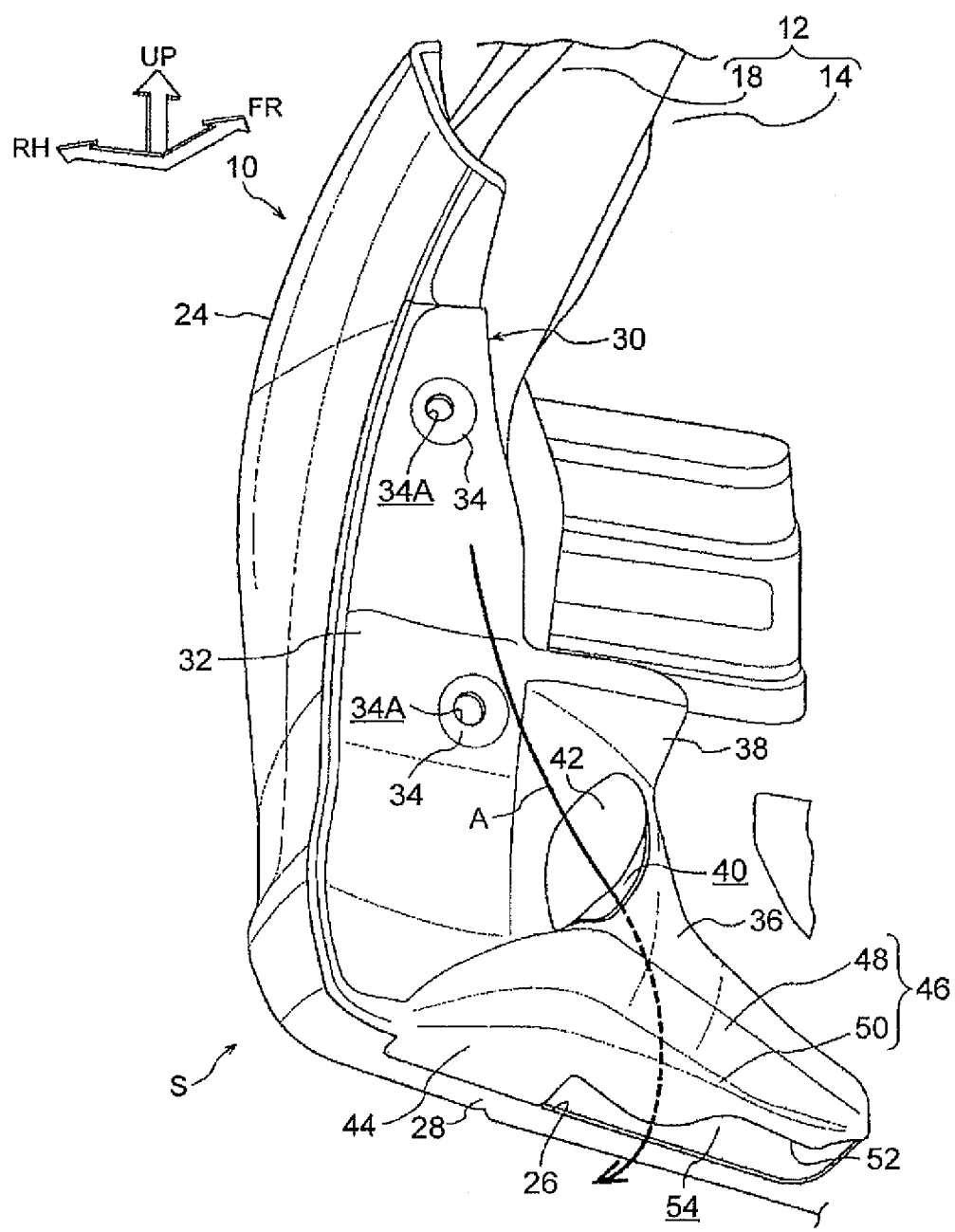
FIG. 1 is a perspective view illustrating a rear part of a rear wheel house of a vehicle to which a vehicle rear structure according to the present embodiment is applied, when viewed from a diagonally lower side on a vehicle right front side.

As illustrated in FIGS. 1 and 4, the bumper seal 30 is formed in a generally L-shaped plate shape when viewed from the vehicle front side, and a lower end of the bumper seal 30 is bent toward a vehicle rear side.

A vehicle width direction outer part of the bumper seal 30 serves as a body wall portion 32. The body wall portion 32 is formed in a generally rectangular plate shape when viewed from the vehicle front side, and is curved along the outer peripheral portion of the wheel house outer 18. Two mounting portions 34 are formed in the body wall portion 32, and the mounting portions 34 have a recessed shape opened toward the vehicle front side. A circular mounting hole 34A is formed in the mounting portion 34, and a fastening member (not shown) such as a grommet or a bolt is inserted into the mounting hole 34A, so that the body wall portion 32 is fastened to the wheel house outer 18.

Further, a vehicle width direction inner part of the bumper seal 30 serves as a vertical wall portion 36 as a promoting portion. The vertical wall portion 36 is placed at a vehicle lower side relative to a rear end of the wheel house inner 14. The vertical wall portion 36 is formed in a generally trapezoidal plate shape when viewed from the vehicle front side, and is extended inwardly in the vehicle width direction from a vehicle lower side part of the body wall portion 32. More specifically, the vertical wall portion 36 is placed so as to be inclined toward the vehicle rear side as it goes toward the inner side in the vehicle width direction, in a plan view (see FIG. 3).

Further, a connection piece 38 is formed integrally with an upper part of a vehicle width direction outer part of the vertical wall portion 36. The connection piece 38 is formed in a generally trapezoidal plate shape when viewed from the vehicle front side, and a vehicle width direction outer part of the connection piece 38 is connected to the body wall portion 32. A vehicle lower side part of the connection piece 38 is bent diagonally toward the vehicle rear side, so as to be connected to the vertical wall portion 36. Hereby, a rear end of the wheel house inner 14 is smoothly connected to the vertical wall portion 36 via the connection piece 38.

Further, a part of the vehicle width direction outer part of the vertical wall portion 36 is cut and squeezed toward the vehicle rear side, so that a first opening 40 as the promoting portion is hereby formed in the vertical wall portion 36. The first opening 40 has a generally arc shape opened diagonally upward toward the outer side in the vehicle width direction, when viewed from the vehicle front side, and the first opening 40 is also opened diagonally upward toward the outer side in the vehicle width direction. That part of the vertical wall portion 36 which is squeezed toward the vehicle rear side serves as a guide portion 42, and the guide portion 42 is placed so as to be inclined toward the vehicle rear side as it goes diagonally downward toward the inner side in the vehicle width direction.

Figure 5:
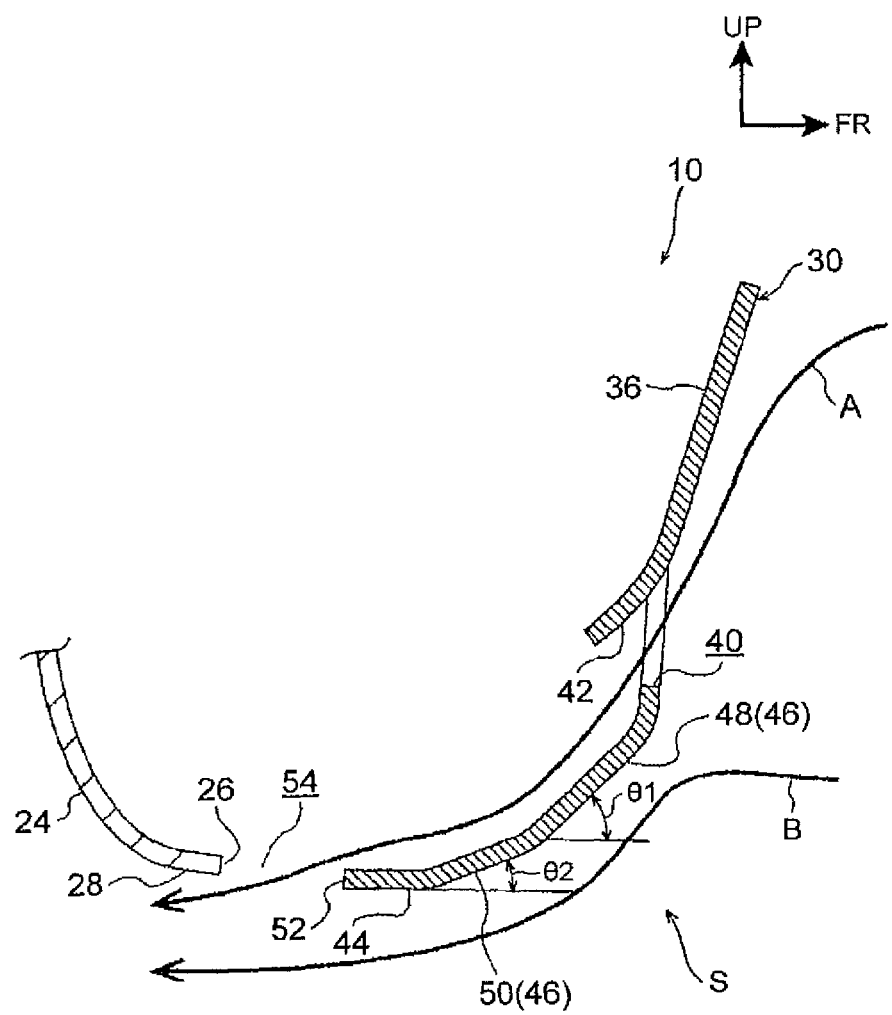
FIG. 5 is a sectional view of a bumper seal illustrated in FIG. 3, when viewed from the vehicle right side (a sectional view taken along a line 5-5 in FIG. 3).

As illustrated in FIGS. 1, 3, 4, a lower end of the bumper seal 30 is a bottom wall portion 44. The bottom wall portion 44 is placed with its plate-thickness direction being along a generally vehicle up-down direction, and is connected to the body wall portion 32 and the vertical wall portion 36. Further, an inclined wall portion 46 is formed in boundary portions of the body wall portion 32 and the vertical wall portion 36 with respect to the bottom wall portion 44, and the inclined wall portion 46 is placed so as to be inclined toward the vehicle rear side as it goes toward the vehicle lower side in a side view. Further, the vertical wall portion 36 is smoothly connected to the inclined wall portion 46, so that a continuous surface is formed of a front surface of the vertical wall portion 36 and a front surface of the inclined wall portion 46. Further, as illustrated in FIG. 5, the inclined wall portion 46 is constituted by an upper inclined wall portion 48 constituting an upper part of the inclined wall portion 46, and a lower inclined wall portion 50 constituting a lower part of the inclined wall portion 46. Further, an angle θ1 formed by the upper inclined wall portion 48 relative to the vehicle front-rear direction is set to be larger than an angle θ2 formed by the lower inclined wall portion 50 relative to the vehicle front-rear direction. Further, as illustrated in FIGS. 1 and 4, connection portions of the body wall portion 32 and the vertical wall portion 36 with the upper inclined wall portion 48 are curved when viewed from the vehicle front side, and the angle θ1 and the angle θ2 are set to be gradually decreased toward the outer side in the vehicle width direction.

Further, as illustrated in FIG. 3, a rear end of the bottom wall portion 44 has a notch portion 52 formed in a vehicle width direction inner part thereof, and the notch portion 52 is opened toward the vehicle rear side and toward the inner side in the vehicle width direction in a plan view. In the meantime, the rear bumper 24 described above has a notch portion 26 formed at a position corresponding to the notch portion 52, so that the notch portion 26 is opened toward the vehicle front side and toward the outer side in the vehicle width direction. Hereby, a second opening 54 is formed in an underfloor 28 of the vehicle 10 by the notch portion 52 of the bottom wall portion 44 and the notch portion 26 of the rear bumper 24. The second opening 54 is placed at the inner side, in the vehicle width direction, relative to the first opening 40.

Further, a lateral wall portion 56 is formed in an inner end of the vertical wall portion 36 in the vehicle width direction. The lateral wall portion 56 extends from the inner end of the vertical the wall portion 36 in the vehicle width direction toward the vehicle rear side with its plate-thickness direction being along the vehicle width direction. Further, the lateral wall portion 56 is connected to the bottom wall portion 44. That is, the lateral wall portion 56 is provided at the inner side, in the vehicle width direction, relative to the second opening 54 so as to be extended in the vehicle front-rear direction.

Figure 6A:
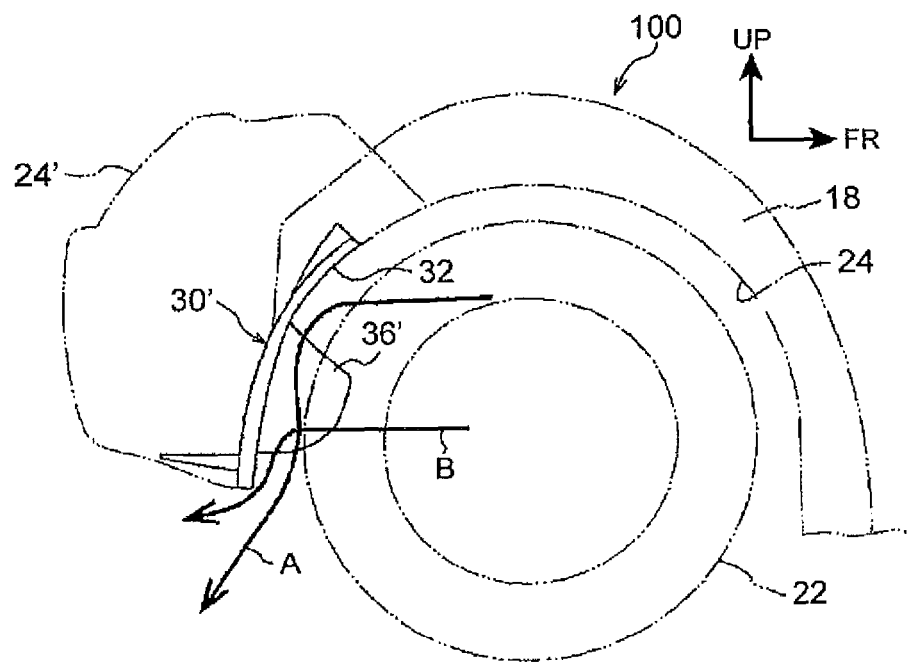
FIG. 6A is a side view illustrating a rear wheel house of a vehicle in a comparative example, and corresponds to FIG. 2.
Figure 6B:
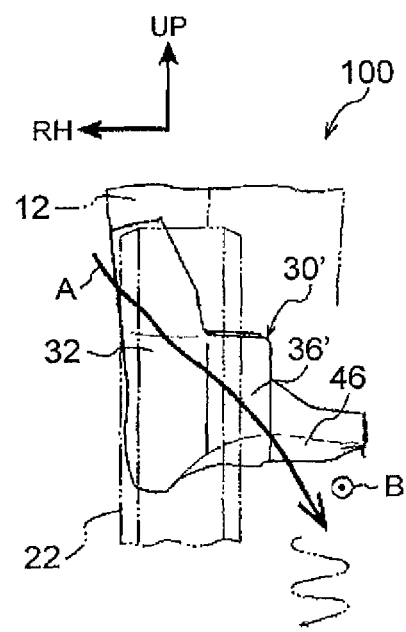
FIG. 6B is a front view illustrating a rear part of the rear wheel house of the vehicle in the comparative example, and corresponds to FIG. 4.
Figure 6C:
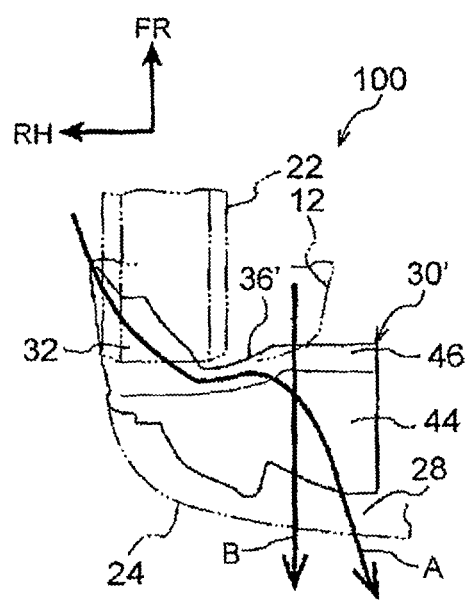
FIG. 6C is a plan view illustrating the rear part of the rear wheel house of the vehicle in the comparative example, and corresponds to FIG. 3.

The following describes operations and effects of the present embodiment, in comparison with a vehicle 100 of a comparative example illustrated in FIGS. 6A to 6C. The vehicle 100 of the comparative example is configured in a similar manner to the vehicle 10 of the present embodiment except for part of the bumper seal 30 and part of the rear bumper 24 of the present embodiment.

That is, in a bumper seal 30' of the comparative example, a vertical wall portion 36' is inclined in a curved manner toward the vehicle front side as it goes toward the inner side in the vehicle width direction in a plan view. In other words, the vertical wall portion 36' is curved so as to wrap a rear tire 22 in a plan view (see FIG. 6C). Further, the first opening 40 of the present embodiment is omitted in a bumper seal 30'. Further, the notch portion 26 of the present embodiment is omitted in a rear bumper 24' of the comparative example, so that the second opening 54 of the present embodiment is not formed in an underfloor 28 of the vehicle 100.

When air flows from a side part (a vehicle width direction outer part) of the vehicle 100 into a rear wheel house 12 at the time of running of the vehicle 100, an airflow A that blows diagonally downward toward the inner side in the vehicle width direction is caused along a rear part (the bumper seal 30') of the rear wheel house 12 (see arrows A in FIGS. 6A to 6C). Since the first opening 40 is not formed in the bumper seal 30', the airflow A that blows downward toward the inclined wall portion 46 has a relatively large flow component toward the vehicle lower side.

Further, in the vehicle 100 of the comparative example, since the vertical wall portion 36' is curved so as to wrap the rear tire 22 in a plan view, the airflow A flows in a zigzag manner in the vehicle width direction along the vertical wall portion 36' (see an arrow of an alternate long and two short dashes line of FIG. 6B). Accordingly, a flow component toward the vehicle front side is caused in the airflow A, so that the airflow A is hard to flow toward the vehicle rear side along the inclined wall portion 46.

As a result, in the vehicle 100 of the comparative example, the airflow A cannot flow along the inclined wall portion 46, which causes the airflow A from detaching from the inclined wall portion 46, so that the airflow A may be blown toward the vehicle lower side from the rear end of the rear wheel house 12 (see FIG. 6A). This increases a lift coefficient (a Cl value) of the vehicle 100 and decreases steering stability of the vehicle 100.

Further, when the airflow A is blown toward the vehicle lower side from the rear end of the rear wheel house 12, the airflow A interferes with an airflow B flowing toward the vehicle rear side at the inner side, in the vehicle width direction, relative to the rear tire 22. Accordingly, turbulence of the air occurs at the vehicle rear side relative to the rear tire 22, which increases a coefficient of air resistance (a Cd value).

In the meantime, in the vehicle 10 to which the vehicle-body rear structure S according to the present embodiment is applied, when air flows from the side part (the vehicle width direction outer part) of the vehicle 10 into the rear wheel house 12 at the time of running of the vehicle 10, an airflow A that blows diagonally downward toward the inner side in the vehicle width direction along the rear part (the bumper seal 30) of the rear wheel house 12 is caused, similarly to the above (see arrows A in FIGS. 2 to 5).

Here, the first opening 40 is formed in the vertical wall portion 36, and the second opening 54 is formed in the underfloor 28 at the vehicle rear side relative to the rear wheel house 12. Accordingly, as illustrated in FIG. 5, the airflow A partially flows into the first opening 40, and hits a rear face of the inclined wall portion 46. Then, the airflow A thus hitting the rear face of the inclined wall portion 46 is efficiently changed in direction toward the vehicle rear side by the inclined wall portion 46, so as to be discharged from the second opening 54 to the vehicle rear side. In the meantime, the airflow A that cannot enter the first opening 40 flows toward the inclined wall portion 46 along the vertical wall portion 36 so that the airflow A is drawn to the airflow A flowing into the first opening 40. Accordingly, the airflow A that cannot enter the first opening 40 is promoted to flow toward the vehicle rear side along the front surface of the inclined wall portion 46. As a result, detachment of the airflow A from the inclined wall portion 46 is restrained, and the airflow A flows toward the vehicle rear side along the underfloor 28 of the vehicle. Hereby, it is possible to restrain a decrease in steering stability due to the air flowing from a side part of the vehicle 10 into the rear wheel house 12.

Besides, as described above, the airflow A flowing into the first opening 40 hits the rear face of the inclined wall portion 46, which causes a down force in the vehicle 10. This makes it possible to improve steering stability of the vehicle 10 by use of the airflow A flowing into the first opening 40.

Further, since the airflow A flows toward the vehicle rear side along the front surface of the inclined wall portion 46, thereby restraining interference between the airflow A and the airflow B flowing toward the vehicle rear side at the inner side, in the vehicle width direction, relative to the rear tire 22. Accordingly, turbulence of the air is restrained at the vehicle rear side relative to the rear tire 22, which can restrain an increase in the coefficient of air resistance (the Cd value).

Further, the second opening 54 is placed at the inner side, in the vehicle width direction, relative to the first opening 40. As a result, the airflow A flowing into the first opening 40 can be discharged from the second opening 54 efficiently.

That is, as described above, the airflow A blows diagonally downward toward the inner side in the vehicle width direction along the rear part of the rear wheel house 12. Accordingly, a flow component toward the inner side in the vehicle width direction is included in the airflow A. Hereby, when the second opening 54 is placed at the inner side, in the vehicle width direction, relative to the first opening 40, the airflow A flowing into the first opening 40 flows toward the second opening 54, so that the airflow A is discharged from the second opening 54 efficiently.

Further, the first opening 40 is opened diagonally upward toward the outer side in the vehicle width direction. This allows an opening direction of the first opening 40 to generally accord with a flowing direction of the airflow A. This makes it possible to flow the airflow A into the first opening 40 efficiently.

Besides, the guide portion 42 is formed in the vertical wall portion 36, and the guide portion 42 is inclined toward the vehicle front side as it goes diagonally upward toward the outer side in the vehicle width direction from an edge portion of the first opening 40 on the vehicle rear side. Hereby, part of the airflow A flowing along the vertical wall portion 36 can be guided toward the first opening 40 by the guide portion 42.

Further, the vertical wall portion 36 is inclined toward the vehicle rear side as it goes toward the inner side in the vehicle width direction in a plan view. Because of this, it is possible to restrain meandering of the airflow A as described in the comparative example. Hereby, occurrence of the flow component toward the vehicle front side in the airflow A is restrained, so that the airflow A can more easily flow toward the vehicle rear side along the front surface of the inclined wall portion 46.

Further, the bumper seal 30 is provided with the lateral wall portion 56. The lateral wall portion 56 is provided at the inner side, in the vehicle width direction, relative to the second opening 54 so as to be extended in the vehicle front-rear direction. Hereby, when the airflow A flowing into the first opening 40 partially hits the lateral wall portion 56, the airflow A is changed in direction toward the vehicle rear side, so as to flow toward the second opening 54. This allows the air hitting the lateral wall portion 56 to flow toward the vehicle rear side from the second opening 54.

Note that, in the present embodiment, the vertical wall portion 36 is inclined toward the vehicle rear side as it goes toward the inner side in the vehicle width direction in a plan view. Alternatively, the vertical wall portion 36 may be extended along the vehicle width direction in a plan view. Further, if the airflow A that cannot enter the first opening 40 can be sufficiently flowed toward the vehicle rear side along the front surface of the inclined wall portion 46 by the airflow A flowing into the first opening 40, the vertical wall portion 36 may be inclined toward the vehicle front side as it goes toward the inner side in the vehicle width direction in a plan view.

Further, in the present embodiment, the inclined wall portion 46 is constituted by two inclined wall portions, i.e., the upper inclined wall portion 48 and the lower inclined wall portion 50. However, the inclined wall portion 46 may be constituted by one or three or more inclined wall portions. Further, in a case where the inclined wall portion 46 is constituted by one inclined wall portion, the inclined wall portion 46 may be inclined in a curved shape (an arc shape) toward the vehicle rear side as it goes toward the vehicle lower side in a side view. Further, in this case, a curvature radius of the inclined wall portion 46 may be set to become larger as it goes toward the vehicle lower side.

Further, in the present embodiment, the first opening 40 is formed in the vertical wall portion 36, and the second opening 54 is formed in the underfloor 28. However, the first opening 40 and the second opening 54 may be omitted depending on various vehicles, for example. Even in this case, the vertical wall portion 36 is smoothly connected to the inclined wall portion 46, so that the continuous surface is formed of the front surface of the vertical wall portion 36 and the front surface of the inclined wall portion 46. Hereby, the airflow A is promoted to flow toward the vehicle rear side along the front surface of the vertical wall portion 36 and the front surface of the inclined wall portion 46. As a result, detachment of the airflow A from the inclined wall portion 46 is restrained, and the airflow A flows toward the vehicle rear side along the underfloor 28 of the vehicle. Hereby, it is possible to effectively restrain a decrease in steering stability due to the air flowing from the side part of the vehicle 10 into the rear wheel house 12.

Further, a shape, a position, a size, and the like of the first opening 40 and an inclination angle of the vertical wall portion 36 relative to the vehicle width direction in the present embodiment may be changed appropriately in accordance with a flow of the airflow A in various vehicles. For example, the first opening 40 may be formed in the inclined wall portion 46. Alternatively, the connection piece 38 of the bumper seal 30 may be placed at the vehicle front side relative to the wheel house inner 14, and the first opening 40 that is opened toward the vehicle upper side may be formed between the rear end of the wheel house inner 14 and the connection piece 38. Alternatively, a slit extending in the vehicle up-down direction and opened toward the vehicle upper side may be formed between the vertical wall portion 36 and the body wall portion 32, and the vertical wall portion 36 may be placed at the vehicle front side relative to the body wall portion 32, so that the slit is taken as the first opening 40.

Further, in the present embodiment, the notch portion 52 is formed in the bottom wall portion 44 of the bumper seal 30, and the second opening 54 is formed in the underfloor 28 by the bumper seal 30 and the rear bumper 24. Alternatively, the notch portion 52 of the bumper seal 30 may be modified to a hole, so that the hole is taken as the second opening 54.

Further, in the present embodiment, the vehicle-body rear structure S is applied to the bumper seal 30, but a member to which the vehicle-body rear structure S is applied is not limited to this. For example, the vehicle-body rear structure S may be applied to a fender liner placed in the rear wheel house 12.

The invention claimed is:

1. A vehicle-body rear structure comprising:
    an inclined wall portion provided in a rear end of a wheel house in which a rear wheel is placed, so as to be the inclined wall portion being inclined, in a side view, rearward in a vehicle front-rear direction by a smaller angle relative to the vehicle front-rear direction as the inclined wall portion extends downward in a vehicle up-down direction;
    a promoting portion provided in a rear part of the wheel house, the promoting portion including a vertical wall portion and a first opening, the vertical wall portion being connected to an upper portion of the inclined wall portion and extending upward in the vehicle up-down direction, and the first opening being formed in the vertical wall portion, the promoting portion being configured to promote air flowing from a vehicle side part into the wheel house to flow rearward in the front-rear direction along the inclined wall portion; and a second opening formed in an underfloor placed rearward relative to the wheel house in the vehicle front-rear direction, the second opening being placed inward, in a vehicle width direction, relative to the first opening.

2. A vehicle-body rear structure according to claim 1, wherein
the first opening is opened outward in the vehicle width direction and diagonally upward.

3. The vehicle-body rear structure according to claim 1, wherein
a lateral wall portion extending in the vehicle front-rear direction is formed inward relative to the second opening in the vehicle width direction.

4. The vehicle-body rear structure according to claim 1, wherein
the vertical wall portion is extended along the vehicle width direction in a plan view.

5. The vehicle-body rear structure according to claim 1, wherein
the vertical wall portion is inclined, in a plan view, rearward in the vehicle front-rear direction by a smaller angle relative to the vehicle front-rear direction as the vertical wall portion extends inward in the vehicle width direction.

6. The vehicle-body rear structure according to claim 1, wherein
the first opening is disposed rearward relative to the rear wheel.

* * * * *